United States Patent
Wu (10) Patent No.: US 10,437,222 B2
(45) Date of Patent: Oct. 8, 2019

(54) HANDHELD TOOL, METHOD FOR ADJUSTING SHAPE OF HANDLE BODY AND APPARATUS USING THE SAME

(71) Applicant: BEIJING XIAOMI MOBILE SOFTWARE CO., LTD., Beijing (CN)

(72) Inventor: Ke Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/837,635

(22) Filed: Dec. 11, 2017

(65) Prior Publication Data

US 2018/0173187 A1 Jun. 21, 2018

(30) Foreign Application Priority Data

Dec. 19, 2016 (CN) .......................... 2016 1 1180160

(51) Int. Cl.
*B25F 5/02* (2006.01)
*G05B 19/18* (2006.01)
(Continued)

(52) U.S. Cl.
CPC .......... *G05B 19/186* (2013.01); *B25B 13/481* (2013.01); *B25F 5/02* (2013.01);
(Continued)

(58) Field of Classification Search
CPC ......... B25B 13/481; B25B 23/00; B25F 5/02; B25G 1/063; G01S 15/08; G01S 17/08; G05B 19/186; G05B 2219/39403
See application file for complete search history.

(56) References Cited

U.S. PATENT DOCUMENTS

| 5,069,091 A | 12/1991 | Bramsiepe et al. |
| 5,435,059 A | 7/1995 | Chawla |

(Continued)

FOREIGN PATENT DOCUMENTS

| CN | 1754661 A | 4/2006 |
| CN | 1910015 A | 2/2007 |

(Continued)

OTHER PUBLICATIONS

Combined Chinese Office Action and Search Report dated Aug. 2, 2018 in Chinese Patent Application No. 201611180160.4, 6 pages.

(Continued)

*Primary Examiner* — Abdelmoniem I Elamin
(74) *Attorney, Agent, or Firm* — Oblon, McClelland, Maier & Neustadt, L.L.P.

(57) ABSTRACT

The present disclosure relates to a handheld tool, a method of adjusting a shape of a handle body and an apparatus using the same. The handheld tool includes a tool head; a handle body connected to the tool head; a ranger configured to scan and measure a radius of rotation of the handle body, wherein the radius of rotation of the handle body indicates a minimum value of a maximum unobstructed length of the handle body in each radial direction of a rotation direction; and a controller connected to the handle body and the ranger and configured to: detect an operation instruction with regard to the tool, and in response to the operation instruction, control the ranger to measure the radius of rotation of the handle body and adjust a shape of the handle body based on the measured radius of rotation.

12 Claims, 9 Drawing Sheets

(51) Int. Cl.
*B25G 1/06* (2006.01)
*B25B 13/48* (2006.01)
*G01S 15/08* (2006.01)
*G01S 17/08* (2006.01)
*B25B 23/00* (2006.01)

(52) U.S. Cl.
CPC .............. *B25G 1/063* (2013.01); *B25B 23/00* (2013.01); *G01S 15/08* (2013.01); *G01S 17/08* (2013.01); *G05B 2219/39403* (2013.01)

(56) References Cited

U.S. PATENT DOCUMENTS

| | | | | |
|---|---|---|---|---|
| 5,890,405 | A * | 4/1999 | Becker | B25B 23/0064 81/434 |
| 6,898,860 | B2 * | 5/2005 | Wu | B25H 1/0092 33/286 |
| 7,331,113 | B1 * | 2/2008 | Patrick | B25H 1/0092 33/286 |
| 9,144,875 | B2 * | 9/2015 | Schlesak | B23Q 11/0092 |
| 9,676,073 | B2 * | 6/2017 | Schubert | B23Q 17/2233 |
| 9,740,800 | B2 * | 8/2017 | Suryanarayan | G06F 17/50 |
| 2002/0145724 | A1 * | 10/2002 | Wursch | B23B 49/008 356/4.01 |
| 2007/0000097 | A1 | 1/2007 | Smith et al. | |
| 2013/0019735 | A1 * | 1/2013 | Koeder | B23D 59/001 83/697 |
| 2014/0005807 | A1 * | 1/2014 | Busschaert | G05B 19/02 700/83 |
| 2015/0081253 | A1 * | 3/2015 | Suryanarayan | G06F 17/50 703/1 |
| 2015/0090078 | A1 * | 4/2015 | Yu | B25B 23/141 81/475 |
| 2015/0183097 | A1 | 7/2015 | Reiz | |
| 2017/0285605 | A1 * | 10/2017 | Iyer | G05B 19/058 |
| 2018/0161965 | A1 * | 6/2018 | Kumar | B25H 1/0078 |

FOREIGN PATENT DOCUMENTS

| | | |
|---|---|---|
| CN | 202985535 U | 6/2013 |
| CN | 205237884 U | 5/2016 |
| GB | 2 412 623 A | 10/2005 |
| JP | 2000-176852 A | 6/2000 |
| JP | 2002-357208 A | 12/2002 |
| JP | 2006095626 A * | 4/2006 |
| WO | WO 2014/017962 A1 | 1/2014 |

OTHER PUBLICATIONS

Extended European Search Report dated May 15, 2018 in European Patent Application No. 17208086.3, 5 pages.

* cited by examiner

HANDHELD TOOL, METHOD FOR ADJUSTING SHAPE OF HANDLE BODY AND APPARATUS USING THE SAME

CROSS-REFERENCE TO RELATED APPLICATIONS

This application is based upon and claims priority to Chinese Patent Application Serial No. CN 201611180160.4, filed on Dec. 19, 2016, the entire contents of which are incorporated herein by reference.

TECHNICAL FIELD

The present disclosure relates to the field of mechanical tool technology, and more particularly, to a handheld tool, a method for adjusting a shape of a handle body and an apparatus using the method.

BACKGROUND

A screwdriver is frequently used during installation and disassembly of a device. A user adopts the screwdriver to twist a screw to fix or disassemble the screw. A shape of a tool bit of the screwdriver may be straight-shaped, a cross-shaped, star-shaped, square-head shaped, hexagon-head shaped, Y-shaped, and so on.

In the related art, the user aligns the tool bit of the screwdriver with a top pit of the screw, and rotates a handle to fix or disassemble the screw.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a handheld tool. The handheld tool includes a tool head; a handle body connected to the tool head; a ranger configured to scan and measure a radius of rotation of the handle body, wherein the radius of rotation of the handle body indicates a minimum value of a maximum unobstructed length of the handle body in each radial direction of a rotation direction; and a controller connected to the handle body and the ranger and configured to: detect an operation instruction with regard to the tool, and in response to the operation instruction, control the ranger to measure the radius of rotation of the handle body and adjust a shape of the handle body based on the measured radius of rotation.

The operation instruction includes an operating strength, and the controller is configured to adjust the shape of the handle body based on the operating strength and the radius of rotation.

The ranger is configured to measure the radius of rotation of the handle body by using a first scanning ranging technique, wherein the first scanning ranging technique includes at least one of an infrared ranging technology, a laser ranging technology, and an ultrasonic ranging technology.

The controller is configured to adjust a length and a thickness and/or a shape of the handle body based on the radius of rotation.

The ranger is configured to scan and measure the maximum unobstructed length in each radial direction of the rotation direction of the handle body, and determine the radius of rotation of the handle body based on the maximum unobstructed length in each radial direction of the rotation direction of the handle body.

Aspects of the disclosure provide a method of adjusting a shape of a handle body, applied to a handheld tool. The method includes detecting an operation instruction with regard to the tool; scanning and measuring a radius of rotation of the handle body of the tool based on the operation instruction, wherein the radius of rotation of the handle body indicates a minimum value of a maximum unobstructed length of the handle body in each radial direction of a rotation direction; and adjusting the shape of the handle body based on the measured radius of rotation.

The operation instruction includes an operating strength, wherein adjusting the shape of the handle body includes adjusting the shape of the handle body based on the operating strength and the measured radius of rotation.

Scanning and measuring the radius of rotation of the handle body includes measuring the radius of rotation of the handle body by using a first scanning ranging technique, wherein the first scanning ranging technique includes at least one of an infrared ranging technology, a laser ranging technology, and an ultrasonic ranging technology.

Adjusting the shape of the handle body includes adjusting a length and a thickness and/or a shape of the handle body based on the measured radius of rotation.

Scanning and measuring the radius of rotation of the handle body includes scanning and measuring the maximum unobstructed length in each radial direction of the rotation direction of the handle body; and determining the radius of rotation of the handle body based on the maximum unobstructed length in each radial direction of the rotation direction of the handle body.

Aspects of the disclosure provide an apparatus for adjusting a shape of a handle body of a tool. The apparatus includes a processor and a memory for storing instructions executable by the processor. The processor is configured to detect an operation instruction with regard to the tool; scan and measure a radius of rotation of the handle body of the tool based on the operation instruction, wherein the radius of rotation of the handle body indicates a minimum value of a maximum unobstructed length of the handle body in each radial direction of a rotation direction; and adjusting the shape of the handle body based on the measured radius of rotation.

The operation instruction includes an operating strength, and the processor is further configured to adjust the shape of the handle body based on the operating strength and the measured radius of rotation.

The processor is further configured to measure measuring the radius of rotation of the handle body by using a first scanning ranging technique, wherein the first scanning ranging technique includes at least one of an infrared ranging technology, a laser ranging technology and an ultrasonic ranging technology.

The processor is further configured to adjust a length and a thickness and/or a shape of the handle body based on the measured radius of rotation.

The processor is further configured to: scan and measure the maximum unobstructed length in each radial direction of the rotation direction of the handle body; and determine the radius of rotation of the handle body based on the maximum unobstructed length in each radial direction of the rotation direction of the handle body.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

In the related art, for example, as for a screwdriver, when the screwdriver is used during installation and disassembly of a device, a user aligns a tool bit of the screwdriver with a top pit of a screw, and rotates a handle to fix or disassemble the screw. However, the usage of the screwdriver is usually limited by the size of space. For example, in a narrow corner, the screwdriver cannot be rotated or cannot touch the screw due to obstruction of an obstacle, and the operation is difficult and inefficient.

In order to solve the above-mentioned problems, the aspect of the present disclosure provides a handheld tool, including: a tool head, a handle body, a ranging apparatus and a controller, wherein the handle body is connected to the tool head; the ranging apparatus is configured to scan and measure a radius of rotation of the handle body, wherein the radius of rotation of the handle body means a minimum value of a maximum unobstructed length of the handle body in each radial direction of a rotation direction; and the controller is connected to the handle body and the ranging apparatus respectively, configured to, when an operation instruction with regard to the tool is detected, control the ranging apparatus to measure the radius of rotation of the handle body and adjust a shape of the handle body according to the measured radius of rotation. Through the technical scheme provided by the aspect of the present disclosure, the handheld tool may complete the operation in the operating environment with limited space. The handheld tool involved in the technical scheme may be, for example, a screwdriver, or, an electric drill, a curve saw, a miter saw, a wrench or a welding tong or the like which are frequently used in construction. For example, as for the screwdriver, through the technical scheme, the screwdriver may complete the operation of fixing and disassembly of the screw in operating environment with limited space.

Figure 1:
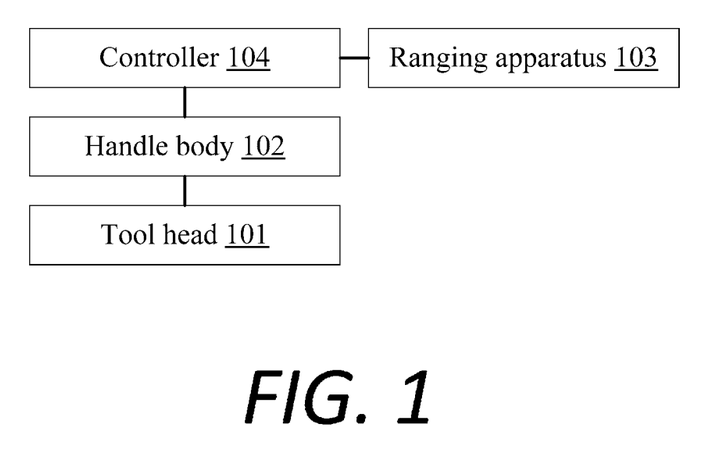
FIG. 1 shows a block diagram of a handheld tool according to an exemplary aspect of the present disclosure.

FIG. 1 shows a block diagram of a handheld tool according to an exemplary aspect. As shown in FIG. 1, the handheld tool includes: a tool head 101, a handle body 102, a ranging apparatus 103 and a controller 104, wherein the handle body 102 is connected to the tool head 101.

As an example, the handle body 102 is fixedly or detachably connected to the tool head 101. The handheld tool may automatically adjust the shape of the handle body 102 according to actual needs, that is, the shape of the handle body 102 may be varied.

The ranging apparatus 103 is configured to scan and measure a radius of rotation of the handle body 102, wherein the radius of rotation of the handle body 102 means a minimum value of a maximum unobstructed length of the handle body in each radial direction of a rotation direction 102.

As an example, the ranging apparatus 103 measures the radius of rotation of the handle body 102 by using a first scanning ranging technique. The first scanning ranging technique may include any one of an infrared ranging technology, a laser ranging technology, an ultrasonic ranging technology, or a combination thereof. In the case of the ultrasonic ranging technique, the ranging apparatus 103 emits an ultrasonic signal in each radial direction of the rotation direction of the handle body 102, and correspondingly receives the returned ultrasonic reception signal. According to the transmission time of the ultrasonic signal, the corresponding reception time of receiving the returned ultrasonic reception signal, and the signal propagation speed of the ultrasonic wave, the unobstructed distance in each radial direction is determined, and the minimum value of the unobstructed distance in each radial direction is determined as the radius of rotation of the handle body 102, wherein the unobstructed distance refers to a distance between the ranging apparatus 103 and an obstacle in the radial direction. It should be noted that a variety of implementations of the first scanning ranging technique may be provided, such that the measurement manners of the scanning ranging will be more various and the accuracy of the measured radius of rotation will be higher.

For example, the ranging apparatus 103 may be located at one end of the handle body 102 which is in contact with the tool head 101, or located at a portion, thinner than other portions, of the handle body 102.

For example, the radius of rotation of the handle body 102 may refer to the minimum value of the maximum unobstructed length of the handle body 102 in the radial direction and the axial direction of the rotation direction. The radial direction refers to a vertical direction of the rotation direction. The axial direction refers to a direction of a rotation axis when the handle body 102 is rotated.

The controller 104 is connected to the handle body 102 and the ranging apparatus 103 respectively, configured to, when an operation instruction with regard to the tool is detected, control the ranging apparatus 103 to measure the radius of rotation of the handle body 102 and adjust a shape of the handle body according to the measured radius of rotation.

As an example, when a user is ready to use a handheld tool, at first he/she places the handheld tool in the actual operation space and then sends an operation instruction to the controller 104 to inform the controller 104 that the user is ready to operate with the handheld tool. In practice, the implementation manner in which the user sends an operation instruction to the controller 104 may include any one of the following: in the first manner, when the controller 104 detects that the user touches a specified position of the controller 104 or the handheld tool, it is determined that the operation instruction with regard to the tool is detected; in the second manner, when the controller 104 detects that the controller 104 or the handheld tool is rotated, it is determined that the operation instruction with regard to the tool is detected.

As an example, the controller 104 sends a measurement request to the ranging apparatus 103 when detecting the operation instruction with regard to the tool. The ranging apparatus 103 measures the radius of rotation of the handle body 102 upon receipt of the measurement request sent by the controller 104 and returns the measurement response which carries with the radius of rotation to the controller. The controller 104 receives the measurement response which carries with the radius of rotation returned by the ranging apparatus 103, and adjusts the shape of the handle body according to the radius of rotation, such that the radial length and the axial length of the handle body are smaller than the radius of rotation.

As an example, the controller 104 may adjust a length and a thickness and/or a shape of the handle body according to the radius of rotation, such that the radial length and axial length of the handle body are smaller than the radius of rotation, so as to ensure that the handheld tool will not be obstructed by obstacles during operating or rotating and the handheld tool will still be able to successfully complete the operation even in the operating environment with limited space. By adjusting the length, the thickness and the shape of the handle body, the shape of the handle body may be adjusted flexibly and comprehensively from each dimension according to the actual operation space, which improves the accuracy of adjustment. The handle body whose shape has been adjusted may better complete the operation successfully in the operating environment with limited space.

In the technical scheme provided by the aspect of the present disclosure, the shape of the handle body may be adjusted, and when an operation instruction with regard to the handheld tool is detected, the controller controls the ranging apparatus to measure the radius of rotation of the handle body and adjusts the shape of the handle body according to the measured radius of rotation, such that both the radial length and the axial length of the handle body are smaller than the radius of rotation, which may dynamically adjust the shape of the handle body according to the actual operation space, and ensure that the handheld tool may still complete the operation successfully in the operating environment with limited space, and the operation efficiency is high. Besides, no manual operation is required in the process of adjusting the shape of the handle body, and the degree of automation is high.

In one possible implementation, the operation instruction includes an operating strength, and the controller 104 adjusts the shape of the handle body 102 according to the operating strength and the radius of rotation.

As an example, when sending an operation instruction to the controller 104, the user may transmit, to the control 104, information, such as the operating strength or the like, of the operation required by the user through the pressing strength and/or duration time when the user presses a designated position of the controller 104 or the handheld tool.

In the technical scheme provided by the aspect of the present disclosure, when the shape of the handle body is adjusted, not only the radius of rotation of the handle body, but also the operating strength is taken into account. An appropriate shape is determined depending on different operating strengths. For example, when the operating strength is large, the handle body may be adjusted to be an L shape, so as to increase the torque, so that it may be effortless and easy to operate.

In one possible implementation, the ranging apparatus 103 scans and measures the maximum unobstructed length in each radial direction of the rotation direction of the handle body 102, and determines the radius of rotation of the handle body 102 according to the maximum unobstructed length in each radial direction of the rotation direction of the handle body 102.

As an example, the maximum unobstructed length, i.e., the unobstructed distance, refers to a distance between the ranging apparatus 103 and the obstacle in the radial direction.

In the technical scheme provided by the above aspect of the present disclosure, before the handheld tool is operated, the radius of rotation of the handle body that the handle body will not be obstructed in each radial direction of the rotation direction is determined by a scanning ranging manner, and the shape of the handle body is adjusted according to the measured radius of rotation, such that both the radial length and the axial length of the handle body are smaller than the radius of rotation, which may dynamically adjust the shape of the handle body according to the actual operation space, such that the handheld tool may still complete the operation successfully in the operating environment with limited space, and the operation efficiency may be improved.

On the basis of the above-described apparatus aspects of the present disclosure, the method aspects of the present disclosure are described below.

Figure 2:
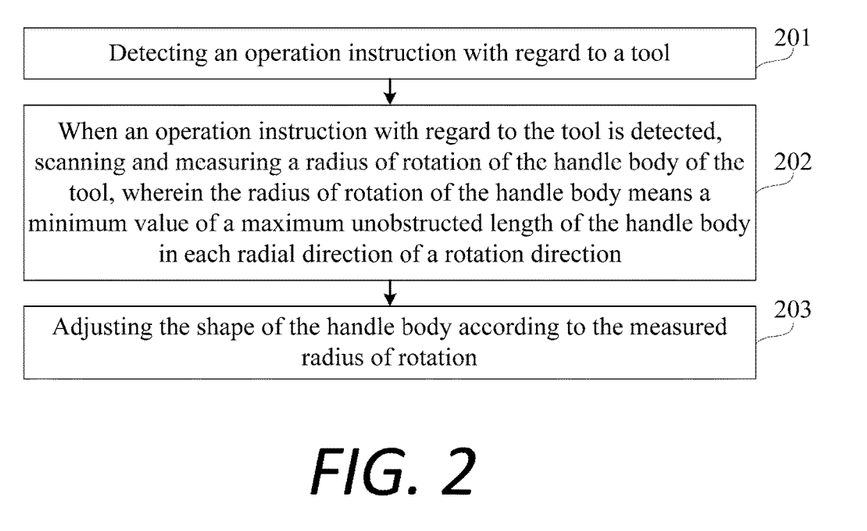
FIG. 2 shows a flow chart of a method of adjusting a shape of a handle body according to an exemplary aspect of the present disclosure.

FIG. 2 shows a flow chart of a method of adjusting a shape of a handle body according to an exemplary aspect. The method may be applied to a handheld tool. The executive body of the method may be a handheld tool or an apparatus which can adjust the shape of the handle body. As shown in FIG. 2, the method includes the following steps 201-203.

In step 201, an operation instruction with regard to the tool is detected.

For example, an operation instruction with regard to the handheld tool from a user is detected. The handheld tool may automatically adjust a shape of the handle body according to actual needs.

For example, when a user is ready to use a handheld tool, at first the handheld tool is placed in the actual operation space, then an operation instruction is sent to the handheld tool or the apparatus which adjusts the shape of the handle body (for example, the handheld tool will be served as the executive body), to indicate that the user is ready to operate with the handheld tool. In practice, the user may send the operation instruction to the handheld tool through any one of the following implementation manner: manner a, it is determined that the operation instruction with regard to the tool from the user is detected when the handheld tool detects that the user has touched the designated position of the handheld tool; and manner b, it is determined that the operation instruction with regard to the tool is detected when it is detected that the handheld tool is rotated.

In step 202, when an operation instruction with regard to the tool is detected, a radius of rotation of the handle body of the tool is scanned and measured, wherein the radius of rotation of the handle body means a minimum value of a maximum unobstructed length of the handle body in each radial direction of a rotation direction.

For example, the handheld tool may measure the radius of rotation of the handle body by using a first scanning ranging technique. The first scanning ranging technique may include any one of an infrared ranging technology, a laser ranging technology, an ultrasonic ranging technology, or a combination thereof. In the case of the ultrasonic ranging technique, the handheld tool emits an ultrasonic signal in each radial direction of the rotation direction of the handle body, and correspondingly receives the returned ultrasonic reception signal. According to the transmission time of the ultrasonic signal, the corresponding reception time of receiving the returned ultrasonic reception signal, and the signal propagation speed of the ultrasonic wave, the unobstructed distance in each radial direction is determined, and the minimum value of the unobstructed distance in each radial direction is determined as the radius of rotation of the handle body, wherein the unobstructed distance refers to the distance between the handheld tool and an obstacle in the radial direction. It should be noted that a variety of implementations of the first scanning ranging technique may be provided, such that the measurement manners of the scanning ranging will be more various and the accuracy of the measured radius of rotation will be higher.

For example, the radius of rotation of the handle body may refer to the minimum value of the maximum unobstructed length of the handle body in the radial direction and the axial direction of the rotation direction. The radial direction refers to a vertical direction of the rotation direction. The axial direction refers to a direction of a rotation axis when the handle body is rotated.

In step 203, the shape of the handle body is adjusted according to the measured radius of rotation.

For example, a length and a thickness and/or a shape of the handle body may be adjusted according to the radius of rotation, such that the radial length and axial length of the handle body are smaller than the radius of rotation. The length, the thickness and the shape of the handle body is adjusted, such that the shape of the handle body may be adjusted flexibly and comprehensively from each dimension according to the actual operation space. The accuracy of adjustment is improved, and the handle body whose shape has been adjusted may better complete the operation successfully in the operating environment with limited space.

In the technical scheme provided by the aspect of the present disclosure, the shape of the handle body may be adjusted, and when an operation instruction with regard to the handheld tool is detected, the radius of rotation of the handle body is measured and the shape of the handle body is adjusted according to the measured radius of rotation, such that both the radial length and the axial length of the handle body are smaller than the radius of rotation, which may dynamically adjust the shape of the handle body according to the actual operation space, and ensure that the handheld tool may still complete the operation successfully in the operating environment with limited space, and the operation efficiency is high. Besides, no manual operation is required in the process of adjusting the shape of the handle body, and the degree of automation is high.

In one possible aspect, the operation instruction includes an operating strength. The step 203 as shown in FIG. 2 may be implemented to adjust the shape of the handle body according to the operating strength and the measured radius of rotation.

As an example, when sending an operation instruction to the handheld tool, the user may transmit to the handheld tool information, such as the operating strength or the like, of the operation required by the user through the pressing strength and/or duration time when the user presses a designated position of the handheld tool.

In the above aspect of the present disclosure, when the shape of the handle body is adjusted, not only the radius of rotation of the handle body, but also the operating strength is taken into account. An appropriate shape is determined depending on different operating strengths. For example, when the operating strength is large, the handle body may be adjusted to be an L shape, so as to increase the torque, so that it may be effortless and easy to operate.

Figure 3:
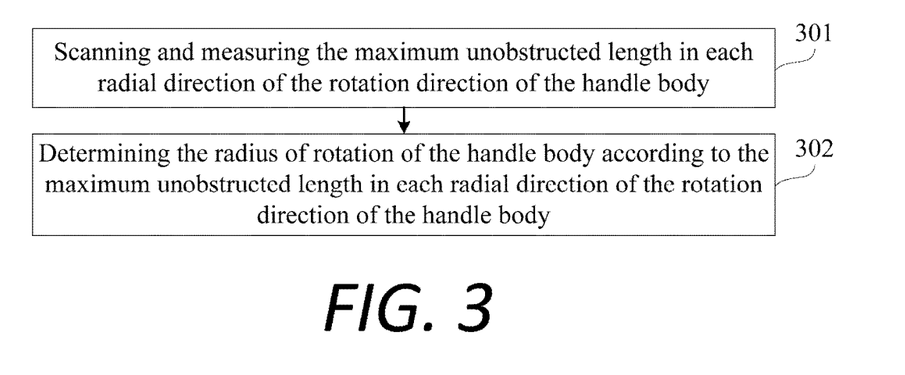
FIG. 3 is a flow chart of step 202 in a method of adjusting a shape of a handle body according to an exemplary aspect of the present disclosure.

In one possible implementation, as shown in FIG. 3, the step 202 as shown in FIG. 2 may be implemented as steps 301-302.

In step 301, the maximum unobstructed length in each radial direction of the rotation direction of the handle body is scanned and measured.

As an example, the maximum unobstructed length, i.e., the unobstructed distance, refers to a distance between the ranging apparatus 103 and the obstacle in the radial direction.

In step 302, the radius of rotation of the handle body is determined according to the maximum unobstructed length in each radial direction of the rotation direction of the handle body.

Before using the handheld tool to operate, the radius of rotation of the handle body that the handle body will not be obstructed in each radial direction of the rotation direction is determined by a scanning ranging manner, and the shape of the handle body is adjusted according to the measured radius of rotation, such that both the radial length and the axial length of the handle body are smaller than the radius of rotation, which may dynamically adjust the shape of the handle body according to the actual operation space, and ensure that the handheld tool may still complete the operation successfully in the operating environment with limited space, and the operation efficiency is improved.

The implementation process is described in detail below with reference to several aspects.

Figure 4:
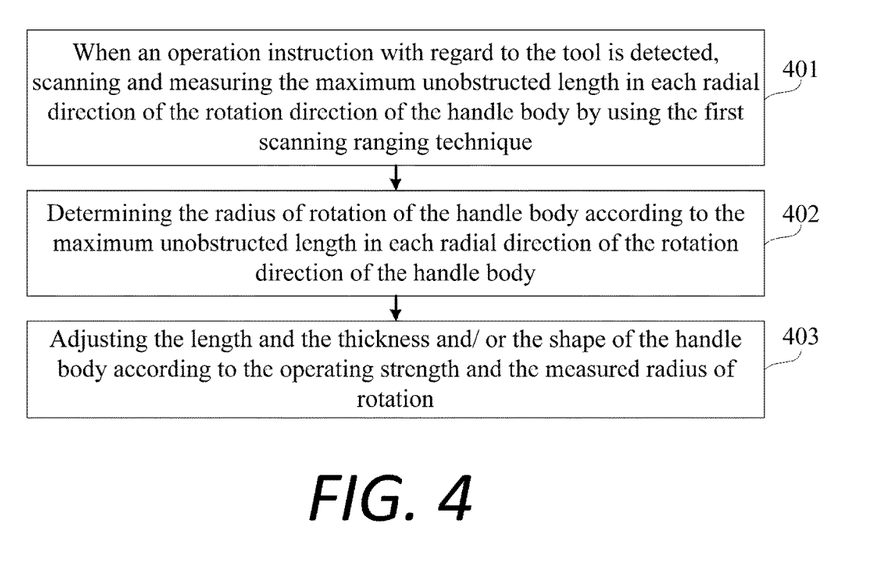
FIG. 4 shows a flow chart of a method of adjusting a shape of a handle body according to an exemplary aspect of the present disclosure.

FIG. 4 shows a flow chart of a method of adjusting a shape of a handle body according to an exemplary aspect. The method is implemented by a handheld tool. As shown in FIG. 4, the method includes the following steps.

In step 401, when an operation instruction with regard to the tool is detected, the maximum unobstructed length in each radial direction of the rotation direction of the handle body is scanned and measured by using the first scanning ranging technique.

In the aspect, the operation instruction includes an operating strength. The first scanning ranging technique includes any one of an infrared ranging technology, a laser ranging technology, an ultrasonic ranging technology, or a combination thereof. The radius of rotation of the handle body means a minimum value of a maximum unobstructed length of the handle body in each radial direction of a rotation direction.

In step 402, the radius of rotation of the handle body is determined according to the maximum unobstructed length in each radial direction of the rotation direction of the handle body.

As an example, the maximum unobstructed length, i.e., the unobstructed distance, refers to a distance between the ranging apparatus 103 and the obstacle in the radial direction.

In step 403, the length and the thickness and/or the shape of the handle body is adjusted according to the operating strength and the measured radius of rotation.

For example, a length and a thickness and/or a shape of the handle body may be adjusted according to the operating strength and the radius of rotation, such that the radial length and axial length of the handle body are smaller than the radius of rotation. The length, the thickness and the shape of the handle body is adjusted, such that the shape of the handle body may be adjusted flexibly and comprehensively from each dimension according to the actual operation space. The accuracy of adjustment is improved, and the handle body whose shape has been adjusted may better complete the operation successfully in the operating environment with limited space.

In the technical scheme provided by the aspect of the present disclosure, the shape of the handle body may be adjusted, and when an operation instruction with regard to the handheld tool is detected, the radius of rotation of the handle body is measured and the shape of the handle body is adjusted according to the measured radius of rotation, such that both the radial length and the axial length of the handle body are smaller than the radius of rotation, which may dynamically adjust the shape of the handle body according to the actual operation space, and ensure that the handheld tool may still complete the operation successfully in the operating environment with limited space, and the operation efficiency is high. Besides, no manual operation is required in the process of adjusting the shape of the handle body, and the degree of automation is high.

As a possible aspect, there is provided a handheld tool having a deformable tool handle. The shape of the tool handle is adjusted according to the degree of strength and the size of the rotation space. A screwdriver is taken as an example, different screwdriver handles/holders are selected depending on different strengths and different sizes of the rotation space. For example, as for the screwdriver, a shape of the screwdriver handle includes: a straight bar shape, a T type, or an L type. The technical scheme of the present aspect includes: to select different screwdriver handles according to the required strength and the size of rotation space. The deformable screwdriver handle refers to a handle whose length, thickness and shape (such as a straight bar shape, a T type, or an L type or other types) or the like may be automatically switched as needed for deformation. For example, in a narrow corner, when an obstacle exists nearby, the handle may be shortened, such that the operation of twisting the screw may be performed in the narrow corner.

Figure 5:
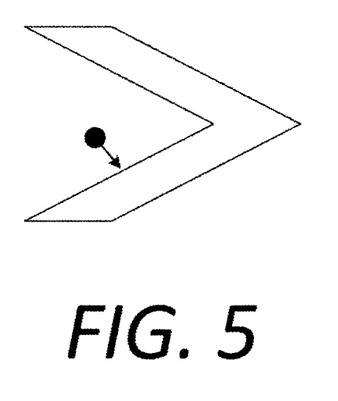
FIG. 5 is a scenario diagram of a method of adjusting a shape of a handle body according to an exemplary aspect of the present disclosure.

Specifically, at first, the screwdriver handle will detect the size of the rotation space. For example, a V-shaped obstacle exists in the operation space as shown in FIG. 5, and the black circle denotes a nail head of a screw. It can be seen that, when the screwdriver is twisting the screw, to ensure smooth rotation, a length of the screwdriver handle may actually reach as long as a length shown by the arrow line. If the handle is longer than the length shown by the arrow line, the screwdriver will hit the V-type obstacle only after being rotated for a length of circle. With this present technical scheme, the screwdriver may automatically preform scanning and ranging in the operation space, to determine the minimum length in the radius of rotation which will not be obstructed.

Secondly, the screwdriver handle automatically adjusts the shape of the handle according to the determined minimum length, to ensure that the screwdriver handle will not be obstructed during the rotation.

Through the technical scheme provided by the aspect of the present disclosure, it may dynamically adjust the shape of the handle body according to the actual operation space, and ensure that the handheld tool may still complete the operation successfully in the operating environment with limited space, and the operation efficiency is high. Besides, no manual operation is required in the process of adjusting the shape of the handle body, and the degree of automation is high.

The following is an apparatus aspect of the present disclosure, which may be used to carry out the method aspects of the present disclosure.

Figure 6:
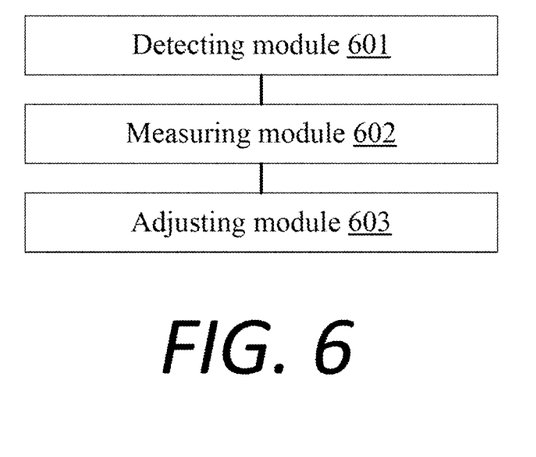
FIG. 6 is a block diagram of an apparatus of adjusting a shape of a handle body according to an exemplary aspect of the present disclosure.

FIG. 6 is a block diagram of an apparatus of adjusting a shape of a handle body according to an exemplary aspect. The apparatus may be implemented in a variety of ways, for example by implementing all components of the apparatus in a handheld tool, alternatively, by implementing components of the apparatus in a coupling manner at the handheld tool side. The apparatus may implement the above methods involved in the present disclosure through software, hardware, or a combination thereof. As shown in FIG. 6, an apparatus of adjusting a shape of a handle body includes: a detecting module 601, a measuring module 602 and an adjusting module 603.

The detecting module 601 is configured to detect an operation instruction with regard to a handheld tool.

The measuring module 602 is configured to, when an operation instruction with regard to the handheld tool is detected, scan and measure a radius of rotation of the handle body of the tool, wherein the radius of rotation of the handle body means a minimum value of a maximum unobstructed length of the handle body in each radial direction of a rotation direction.

The adjusting module 603 is configured to adjust the shape of the handle body according to the measured radius of rotation.

Through the apparatus of adjusting a shape of a handle body provided by an aspect of the present disclosure, the detecting module 601 is configured to detect an operation instruction with regard to a handheld tool; the measuring module 602 is configured to, when an operation instruction with regard to the handheld tool is detected, scan and measure a radius of rotation of the handle body of the tool, wherein the radius of rotation of the handle body means a minimum value of a maximum unobstructed length of the handle body in each radial direction of a rotation direction; the adjusting module 603 is configured to adjust the shape of the handle body according to the measured radius of rotation, such that both the radial length and the axial length of the handle body are smaller than the radius of rotation, which may dynamically adjust the shape of the handle body according to the actual operation space, and ensure that the handheld tool may still complete the operation successfully in the operating environment with limited space, and the operation efficiency is high. Besides, no manual operation is required in the process of adjusting the shape of the handle body, and the degree of automation is high.

For example, the operation instruction includes an operating strength, and the adjusting module 603 adjusts the shape of the handle body according to the operating strength and the measured radius of rotation.

In one possible implementation, the measuring module 602 measures the radius of rotation of the handle body by using a first scanning ranging technique, the first scanning ranging technique includes any one of an infrared ranging technology, a laser ranging technology, an ultrasonic ranging technology, or a combination thereof.

In one possible implementation, the adjusting module 603 adjusts a length and a thickness and/or a shape of the handle body according to the measured radius of rotation.

Figure 7:
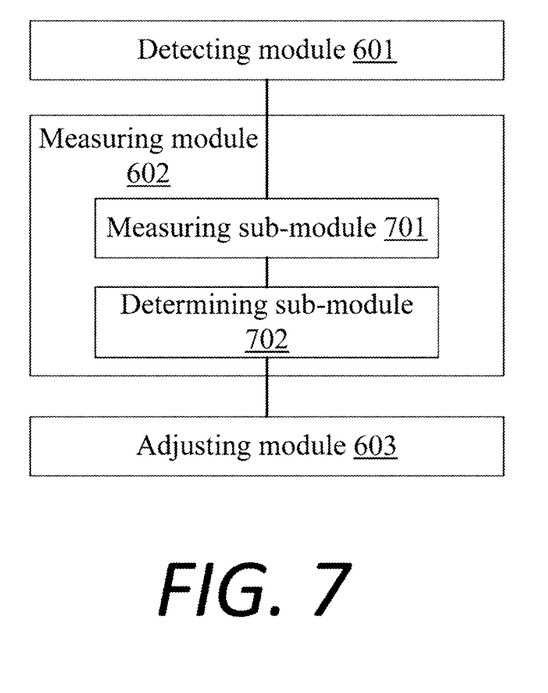
FIG. 7 is a block diagram of an apparatus of adjusting a shape of a handle body according to an exemplary aspect of the present disclosure.

In one possible implementation, as shown in FIG. 7, the apparatus of adjusting a shape of a handle body as shown in FIG. 6 may further include configuring the measuring module 602 to include a measuring sub-module 701 and a determining sub-module 702.

The measuring sub-module 701 is configured to scan and measure the maximum unobstructed length in each radial direction of the rotation direction of the handle body.

The determining sub-module 702 is configured to determine the radius of rotation of the handle body according to the maximum unobstructed length in each radial direction of the rotation direction of the handle body.

Figure 8:
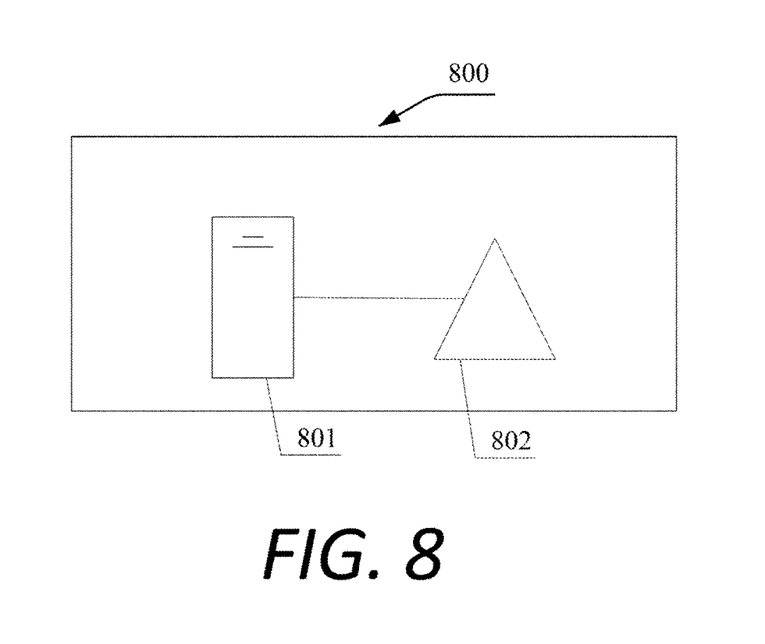
FIG. 8 is a block diagram of an apparatus of adjusting a shape of a handle body according to an exemplary aspect of the present disclosure.

FIG. 8 is a block diagram of an apparatus 800 of adjusting a shape of a handle body according to an exemplary aspect. The apparatus 800 of adjusting a shape of a handle body may be implemented in a variety of ways, for example by implementing all components of the apparatus in a handheld tool, alternatively, by implementing components of the apparatus in a coupling manner at the handheld tool side. The apparatus 800 of adjusting a shape of a handle body includes:

a processor 801; and a memory 802 for storing instructions executable by the processor, wherein the processor 801 is configured to perform: when an operation instruction with regard to the tool is detected, scanning and measuring a radius of rotation of the handle body, wherein the radius of rotation of the handle body means a minimum value of a maximum unobstructed length of the handle body in each radial direction of a rotation direction; and adjusting the shape of the handle body according to the measured radius of rotation.

In one aspect, the operation instruction includes an operating strength, and the above processor 801 may be further configured to: adjust the shape of the handle body according to the operating strength and the radius of rotation.

In one aspect, the above processor 801 may be further configured to: measure the radius of rotation of the handle body by using a first scanning ranging technique, wherein the first scanning ranging technique includes any one of an infrared ranging technology, a laser ranging technology, an ultrasonic ranging technology, or a combination thereof.

In one aspect, the above processor 801 may be further configured to: adjust a length and a thickness and/or a shape of the handle body according to the radius of rotation.

In one aspect, the above processor 801 may be further configured to: scan and measure the maximum unobstructed length in each radial direction of the rotation direction of the handle body; and determine the radius of rotation of the handle body according to the maximum unobstructed length in each radial direction of the rotation direction of the handle body.

In the aspect of the present disclosure, the shape of the handle body may be adjusted and when an operation instruction with regard to the handheld tool is detected, the apparatus of adjusting a shape of a handle body measures the radius of rotation of the handle body and adjusts the shape of the handle body according to the measured radius of rotation, such that both the radial length and the axial length of the handle body are smaller than the radius of rotation, which may dynamically adjust the shape of the handle body according to the actual operation space, and ensure that the handheld tool may still complete the operation successfully in the operating environment with limited space, and the operation efficiency is high. Besides, no manual operation is required in the process of adjusting the shape of the handle body, and the degree of automation is high.

As for the apparatus in the above aspects, the specific implementations for respective modules to perform operations have been described in detail in the aspects regarding methods, and thus the detailed descriptions thereof will not be provided herein.

Figure 9:
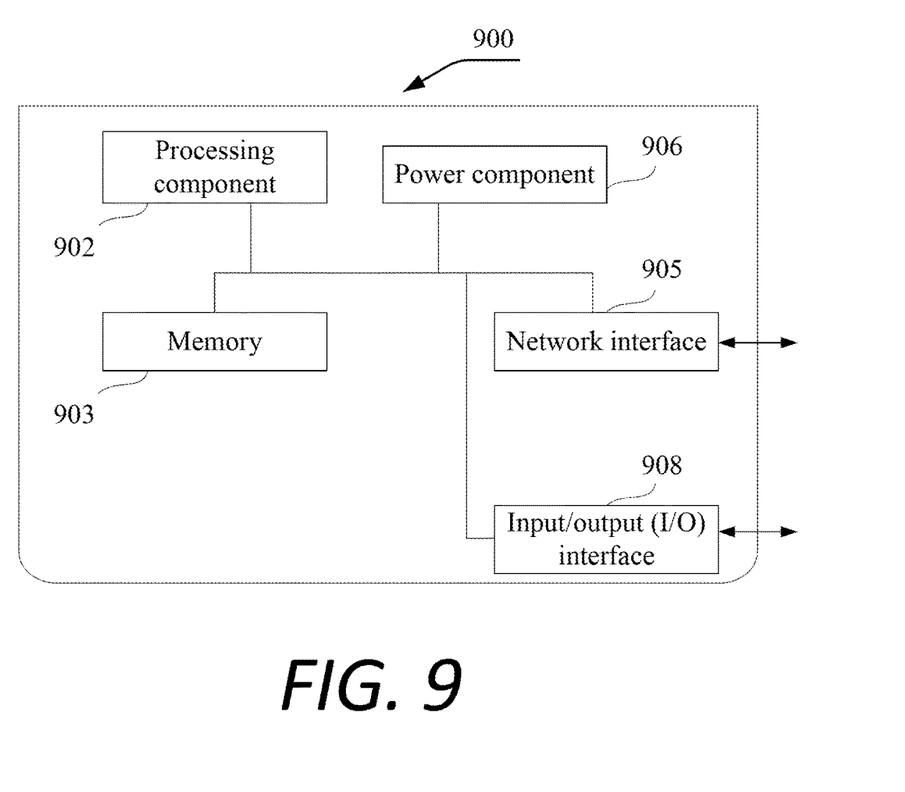
FIG. 9 is a block diagram of an apparatus of adjusting a shape of a handle body according to an exemplary aspect of the present disclosure.

FIG. 9 is a block diagram of an apparatus of adjusting a shape of a handle body according to an exemplary aspect. For example, the apparatus 900 of adjusting a shape of a handle body may be provided as a server. The apparatus 900 of adjusting a shape of a handle body includes a processing component 902 that further includes one or more processors, and memory resources represented by a memory 903 for storing instructions executable by the processing component 902, such as application programs. The application programs stored in the memory 903 may include one or more modules each corresponding to a set of instructions. Further, the processing component 902 is configured to execute the instructions to perform the above described method.

The apparatus 900 of adjusting a shape of a handle body may further include a power component 906 configured to perform power management of the apparatus 900 of adjusting a shape of a handle body, one wired or wireless network interface 905 configured to connect the apparatus 900 of adjusting a shape of a handle body to a network, and an input/output (I/O) interface 908. The apparatus 900 of adjusting a shape of a handle body may operate based on an operating system stored in the memory 903, such as Windows Server™, Mac OS X™, Linux™, FreeBSD™, or the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and aspects be determined as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A handheld tool, comprising:
a tool head;
a handle body connected to the tool head;
a ranger configured to scan and measure a radius of rotation of the handle body, wherein the radius of rotation of the handle body indicates a minimum value of a maximum unobstructed length of the handle body in each radial direction of a rotation direction;
wherein the ranger is configured to scan and measure the maximum unobstructed length in each radial direction of the rotation direction of the handle body, and determine the radius of rotation of the handle body based on the maximum unobstructed length in each radial direction of the rotation direction of the handle body; and
a controller connected to the handle body and the ranger and configured to:
detect an operation instruction with regard to the tool, and
in response to the operation instruction, control the ranger to measure the radius of rotation of the handle body and adjust a shape of the handle body based on the measured radius of rotation.

2. The tool according to claim 1, wherein the operation instruction includes an operating strength, and the controller is configured to adjust the shape of the handle body based on the operating strength and the radius of rotation.

3. The tool according to claim 1, wherein the ranger is configured to measure the radius of rotation of the handle body by using a first scanning ranging technique, wherein the first scanning ranging technique includes at least one of an infrared ranging technology, a laser ranging technology, and an ultrasonic ranging technology.

4. The tool according to claim 1, wherein the controller is configured to adjust a length and a thickness and/or a shape of the handle body based on the radius of rotation.

5. A method of adjusting a shape of a handle body, applied to a handheld tool, comprising:
detecting an operation instruction with regard to the tool;
scanning and measuring a radius of rotation of the handle body of the tool based on the operation instruction, wherein the radius of rotation of the handle body indicates a minimum value of a maximum unobstructed length of the handle body in each radial direction of a rotation direction;
wherein scanning and measuring the radius of rotation of the handle body includes: scanning and measuring the maximum unobstructed length in each radial direction of the rotation direction of the handle body; and determining the radius of rotation of the handle body based on the maximum unobstructed length in each radial direction of the rotation direction of the handle body; and
adjusting the shape of the handle body based on the measured radius of rotation.

6. The method according to claim 5, wherein the operation instruction includes an operating strength,
wherein adjusting the shape of the handle body includes adjusting the shape of the handle body based on the operating strength and the measured radius of rotation.

7. The method according to claim 5, wherein scanning and measuring the radius of rotation of the handle body includes measuring the radius of rotation of the handle body by using a first scanning ranging technique,
wherein the first scanning ranging technique includes at least one of an infrared ranging technology, a laser ranging technology, and an ultrasonic ranging technology.

8. The method according to claim 5, wherein adjusting the shape of the handle body includes adjusting a length and a thickness and/or a shape of the handle body based on the measured radius of rotation.

9. An apparatus for adjusting a shape of a handle body of a tool, comprising:
a processor; and
a memory for storing instructions executable by the processor, wherein the processor is configured to:
detect an operation instruction with regard to the tool;
scan and measure a radius of rotation of the handle body of the tool based on the operation instruction, wherein the radius of rotation of the handle body indicates a minimum value of a maximum unobstructed length of the handle body in each radial direction of a rotation direction;
wherein the processor is further configured to: scan and measure the maximum unobstructed length in each radial direction of the rotation direction of the handle body, and determine the radius of rotation of the handle body based on the maximum unobstructed length in each radial direction of the rotation direction of the handle body; and
adjust the shape of the handle body based on the measured radius of rotation.

10. The apparatus according to claim 9, wherein the operation instruction includes an operating strength, and the processor is further configured to adjust the shape of the handle body based on the operating strength and the measured radius of rotation.

11. The apparatus according to claim 9, wherein the processor is further configured to measure measuring the radius of rotation of the handle body by using a first scanning ranging technique,
wherein the first scanning ranging technique includes at least one of an infrared ranging technology, a laser ranging technology, and an ultrasonic ranging technology.

12. The apparatus according to claim 9, wherein the processor is further configured to adjust a length and a thickness and/or a shape of the handle body based on the measured radius of rotation.

* * * * *